United States Patent Office 3,464,853
Patented Sept. 2, 1969

3,464,853
PROCESS FOR TREATING WOOD AND
ORGANIC MAT MATERIALS
Lawrence E. La May, 714 Huron Hill,
Madison, Wis. 53711
No Drawing. Continuation-in-part of application Ser. No. 532,104, Mar. 7, 1966. This application Nov. 21, 1966, Ser. No. 595,637
Int. Cl. B44d 1/28, 1/06
U.S. Cl. 117—148                        6 Claims

ABSTRACT OF THE DISCLOSURE

A process for treating wood and other cellular or fibrous material by impregnating such material with a solution of resin, oil and alcohol, and subjecting the impregnated material to a temperature and for a period of time sufficient to drive a substantial portion of the alcohol and moisture in the material out of the material, and to harden the resin and oil within the material. The process may be repeated as many times as the treated material continues to take up additional amounts of the solution during the impregnating step.

---

This application is a continuation-in-part of my copending application entitled "Process for Treating Wood and Similar Material and Product Thereof," Ser. No. 532,104, filed Mar. 7, 1966, now abandoned.

The present invention relates to an improved process for treating wood and other organic materials, and the improved products produced by such process.

Wood products and other organic cellular or fibrous materials such as bamboo, animal skins, animal intestines or the like have found many specialized uses in today's society. Some of these uses require products of superior finish and appearance. Others require products of substantial durability, which will resist damage or deterioration from impact, abrasion, vibration, moisture or other external forces or actions. Still others must possess certain special properties such as tone quality where they are employed for the production or transmission of sound. Many of today's products, of course, require a combination of the above properties.

It is a primary object of my invention to provide a process for treating wood and other organic cellular or fibrous materials to protect said materials from damage or deterioration when subjected to physical abuse or severe environmental conditions.

It is an additional object of my invention to provide a process for treating wood and other organic, cellular or fibrous materials which will result in a product having a finish of superior durability and appearance.

It is a further object of my invention to provide a process for treating wood and other organic, cellular or fibrous materials which will make such treated materials substantially non-porous and impervious to moisture.

It is a still further object of my invention to provide a process for treating wood and other organic, cellular or fibrous materials which will improve the tone quality of said materials when employed for the production and transmission of sound.

Other objects and advantages of my invention will be readily apparent from the following detailed description.

My improved process for treating wood and other organic, cellular or fibrous materials involves essentially the steps of impregnating the materials to be treated with a particular composition, which will be described in detail below, and baking the impregnated material to produce the final desired product.

I have found that a composition of resin, vegetable oil, and alcohol, when mixed in the desired proportions and employed as described herein, will impart the desired properties to the treated materials.

Suitable resins for use in my process include those normally employed in the commercial manufacture of varnish such as, for example, mastic, lac, dimar, sandarac, and natural or refined turpentine, as well as commercial synthetic resins, such as soya-phthalic-pentaerythritol alkyd resin solids. Oils which may be employed in my composition include, by way of illustration and not limitation, linseed oil, tung oil, lemon oil, and soybean oil. Any alcohol which will dissolve the particular resins and oils present in the composition is suitable.

The relative proportions of the members of the composition may vary according to the material to be treated and the particular effect desired. Typically, a solution of 1 part resin, 1 part oil and 5 parts alcohol will produce a hard, durable, water impervious product when used on wood articles as described herein. If the wood is close-grained and dense, a higher proportion of alcohol may be desirable to aid in carrying the dissolved resin and oil into the pores of the material. If the wood is of low density and coarse grained, a lower proportion of alcohol may be preferred. If the proportion of resin is increased in comparison to the oil, the finished product will exhibit increased hardness, but may also be more brittle. Increasing the proportion of oil with respect to the resin will reduce the brittleness of the product.

As indicated above, the first step of my process involves impregnating the wood or other material with the described composition. This is preferably accomplished by soaking the material, which should preferably have been previously dried to remove excess moisture, in the composition until the composition has permeated the body of the material to the extent desired. The material is then removed from the composition and placed in an oven or kiln. It is baked in the kiln at a temperature preferably between about 200° F. and 300° F. until substantially all of the alcohol in the composition has been driven off. Such baking also drives off substantially all of the moisture remaining in the wood.

The resin and the oil, which are carried into the pores of the material by the alcohol during soaking to permeate the material, remain in the material after baking. The baking causes the resin and oil to harden within the material, thereby changing the nature of the final product from a porous, cellular or fibrous material of varying degrees of softness, depending upon the particular material, to a dense, substantially non-porous, extremely hard material. Because of the density and hardness of the surface of the material, it will exhibit outstanding resistance to scuffing, scratching, and impact, and can be polished to a high luster. The hardened resin and oil make the final product impervious to moisture.

The degree to which the composition penetrates the treated maternal during soaking will depend on the size, shape and porosity of the material, the viscosity of the composition, and the duration of the soaking. It may be necessary and desirable to treat only the outer portions of some materials, depending upon their intended use. If such is the case, the material need be soaked only for the time required to impregnate the material to the desired depth. On the other hand, where the material is of substantial thickness, it may be necessary for it to soak for an extended period to achieve the penetration and degree of impregnation desired.

I have also found that it may be desirable to repeat the process one or more times for some products. If the pores of the material do not become completely filled the first time the material is treated according to my process, the proces may be repeated as often as necessary to "load up" the material until it will no longer take up and retain additional resin and oil. Again, it may be desirable to treat only the outer portions of certain materials, but to "load up" such portions with resin and oil to the greatest extent possible. Such results may be achieved by subjecting such materials to several repetitions of my process wherein the materials are immersed in the impregnating composition for only a short period during each repetition to prevent the composition from penetrating into the material farther than desired. The process may be repeated until the outer portion of the material will no longer take up and retain additional resin and oil.

My process for treating wood and related materials and products has many applications. Furniture and paneling made with wood require a high quality finish which will resist impact, scuffing and gouging, as well as liquid and food stains. Sporting goods such as golf club heads and bowling pins must be durable, and impact resistant. Because of weight and cost considerations, however, it may be preferable to treat only the outer portion of such articles. Other products made from wood or related products which can expect abuse during normal use will also be improved by my process.

Another interesting effect of treating wood or bamboo according to my process is the improved tone and volume obtainable when such materials are employed in the production and transmission of sound. Violin bodies and piano sounding boards have shown marked improvement in both tone and volume after treatment according to my process. Bamboo reeds for woodwind instruments show particularly good results when treated in accordance with my process. Such treated reeds are extremely durable, and do not deteriorate as quickly when subjected to "biting" during use. Furthermore, in the opinion of those who have used them, the tone and volume obtainable with such reeds is notably superior to similar reeds which are not so treated.

In addition to being extremely beneficial when applied to wood and related materials and products, my process has been found to materially improve the characteristics of animal membranes such as skins and intestines, particularly for use in musical instruments. Drumheads, strings for violins and the like, and pads for various wind instruments such as saxophones or clarinets are all commonly made from such membranes and are subjected to physical and chemical forces when in use. The useful life and dimensional stability of such membranes are greatly enhanced by my treatment. The treated membrane is made impervious to moisture and highly resistant to wear through friction or impact. The deterioration of such materials due to the chemical action of perspiration or saliva is also retarded. Treated membranes have also been found to have excellent tone qualities when used in musical instruments.

The process applied to animal membranes is the same as that for wood and related materials but, typically, the solution used has about twice the amount of oil as that used to treat wood. The preferred solution is, therefore, about 1 part resin, 2 parts oil and 5 parts alcohol. As with wood, the physical properties of the finished product may be controlled by varying the ratio of oil to resin.

My process is not limited, however, to animal membranes to be used in musical instruments. It will improve similar materials for a wide range of uses where resistance to moisture, physical wear and chemical action is a desired quality. Archery bow strings, webbing for lacrosse sticks, tennis rackets and the like are illustrative of other instances where treatment according to my above-described process will result in improved characteristics and performance.

It is understood that my invention is not confined to the particular process and products herein described.

I claim:
1. A process for treating wood and other cellular or fibrous materials, comprising the steps of:
   (a) impregnating at least a portion of the material to be treated with a composition consisting essentially of a solution of approximately 1 part resin, 1 to 2 parts oil selected from the group consisting of linseed oil, tung oil, lemon oil and soybean oil, and from 3 to 8 parts alcohol,
   (b) baking the impregnated material at a temperature and for a period of time sufficient to drive a substantial portion of said alcohol and a substantial portion of the moisture in said material out of said material and to harden the resin and oil within the material.
2. The process described in claim 1 wherein the material is impregnated with the composition by immersing said material in said composition for a period of time sufficient to permit the composition to penetrate the material to the extent desired.
3. The process described in claim 1 wherein the material is baked at a temperature of from approximately 200° F. to 300° F.
4. The process described in claim 1 wherein steps (a) and (b) are repeated at least once.
5. The process described in claim 4 wherein steps (a) and (b) are repeated as many times as the treated material continues to take up additional amounts of the composition during the impregnating step.
6. A process for treating wood and other cellular or fibrous materials, comprising the steps of:
   (a) immersing the material to be treated in a composition consisting essentially of a solution of approximately 1 part resin, 1 to 2 parts oil selected from the group consisting of linseed oil, tung oil, lemon oil and soybean oil, and from 3 to 8 parts alcohol until at least a portion of the material becomes impregnated with said composition.
   (b) placing the impregnated material in an oven heated to a temperature of between approximately 200° F. to 300° F. for a period of time sufficient to remove substantially all of the alcohol and substantially all of the moisture from the treated portion of said material and harden the resin and oil in said material.

References Cited
UNITED STATES PATENTS

| 2,114,784 | 4/1938 | Maisch | 117—148 |
| 2,261,758 | 11/1941 | Gustafsson | 117—148 |

WILLIAM D. MARTIN, Primary Examiner

T. G. DAVIS, Assistant Examiner

U.S. Cl. X.R.

117—149, 161, 167, 168